(12) United States Patent
Fougeras et al.

(10) Patent No.: US 9,421,724 B2
(45) Date of Patent: Aug. 23, 2016

(54) METHOD AND FACILITY FOR MANUFACTURING A TIRE BLANK BY MEANS OF A STRIP

(75) Inventors: Magaly Fougeras, Clermont-Ferrand (FR); Stephane Gatien, Clermont-Ferrand (FR); Patrice Monnereau, Clermont-Ferrand (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 482 days.

(21) Appl. No.: 13/822,286

(22) PCT Filed: Sep. 5, 2011

(86) PCT No.: PCT/FR2011/052024
§ 371 (c)(1),
(2), (4) Date: May 30, 2013

(87) PCT Pub. No.: WO2012/032253
PCT Pub. Date: Mar. 15, 2012

(65) Prior Publication Data
US 2013/0243987 A1    Sep. 19, 2013

(30) Foreign Application Priority Data

Sep. 10, 2010  (FR) .................................... 10 57222

(51) Int. Cl.
| B29D 30/16 | (2006.01) |
| B29C 43/24 | (2006.01) |
| B29C 47/32 | (2006.01) |
| B29D 30/30 | (2006.01) |
| B29C 47/38 | (2006.01) |

(Continued)

(52) U.S. Cl.
CPC ............... *B29D 30/16* (2013.01); *B29C 43/24* (2013.01); *B29C 47/0021* (2013.01); *B29C 47/38* (2013.01); *B29D 30/3028* (2013.01); *B29C 47/004* (2013.01); *B29C 47/32* (2013.01); *B29C 47/52* (2013.01); *B29C 2947/92152* (2013.01); *B29C 2947/92209* (2013.01); *B29C 2947/92409* (2013.01); *B29C 2947/92428* (2013.01); *B29D 30/60* (2013.01); *B29D 30/62* (2013.01); *B29K 2021/00* (2013.01); *Y10T 428/1386* (2015.01)

(58) Field of Classification Search
None
See application file for complete search history.

(56) References Cited

U.S. PATENT DOCUMENTS

| 2,469,633 | A | * | 5/1949 | Corson ......................... 425/307 |
| 5,030,079 | A | * | 7/1991 | Benzing, II ......... B29B 17/0005 264/175 |

(Continued)

FOREIGN PATENT DOCUMENTS

| EP | 1 754 592 | 2/2007 |
| EP | 1 818 165 | 8/2007 |

(Continued)

*Primary Examiner* — Jeffrey Wollschlager
(74) *Attorney, Agent, or Firm* — Cozen O'Connor

(57) ABSTRACT

In the method for manufacturing an uncured blank of a vehicle tire, a strip (30) of rubber is extruded and is made to pass between two members (18, 10) one of which forms a roller (18) for extruding the strip, such that the faces (21, 23) of the strip, forming one and the same section of the strip in a plane perpendicular to a direction of travel of the strip and pressing simultaneously against the respective members, are driven at linear speeds that differ from one another, and that the members (18, 10) stretch the strip between them.

11 Claims, 2 Drawing Sheets

(51) Int. Cl.
*B29C 47/52* (2006.01)
*B29D 30/60* (2006.01)
*B29C 47/00* (2006.01)
*B29D 30/62* (2006.01)
*B29K 21/00* (2006.01)

(56) References Cited

U.S. PATENT DOCUMENTS

| | | | | |
|---|---|---|---|---|
| 5,234,647 | A * | 8/1993 | Harada et al. | 264/167 |
| 6,264,780 | B1 * | 7/2001 | Iwanaga et al. | 156/136 |
| 6,372,070 | B1 * | 4/2002 | Iizuka et al. | 156/117 |
| 8,691,034 | B2 * | 4/2014 | Rey | B29D 30/72 |
| | | | | 156/117 |
| 2004/0013754 | A1 * | 1/2004 | Hirai et al. | 425/31 |
| 2007/0199661 | A1 * | 8/2007 | Nicolas et al. | 156/361 |
| 2008/0011409 | A1 * | 1/2008 | Ogawa | 156/117 |
| 2008/0251185 | A1 | 10/2008 | Cappa | |
| 2009/0025857 | A1 * | 1/2009 | Marangoni et al. | 156/130 |
| 2011/0192526 | A1 * | 8/2011 | Ogawa | 156/117 |
| 2013/0037203 | A1 * | 2/2013 | Amurri et al. | 156/110.1 |

FOREIGN PATENT DOCUMENTS

| | | |
|---|---|---|
| EP | 2 055 460 | 5/2009 |
| FR | 2914581 | 10/2008 |
| WO | WO 2007/000443 | 1/2007 |
| WO | WO 2009/130727 | 10/2009 |
| WO | WO 2009/131578 | 10/2009 |
| WO | WO 2010/055913 | 5/2010 |

* cited by examiner

METHOD AND FACILITY FOR MANUFACTURING A TIRE BLANK BY MEANS OF A STRIP

RELATED APPLICATIONS

This is a U.S. national stage of application No. PCT/FR2011/052024, filed on Sep. 5, 2011.

This patent application claims the priority of French application no. 10/57222 filed Sep. 10, 2010, the disclosure content of which is hereby incorporated by reference.

FIELD OF THE INVENTION

The invention relates to the manufacture of green or uncured tire blanks by means of strips.

BACKGROUND OF INVENTION

It is known practice to manufacture a tire blank by winding onto a drum a strip forming very many turns. By conveniently positioning the strip during the winding, a particular shape and dimensions are given to the profile of the blank. It is known practice notably to form the larger portion of the tread of the blank by means of strips having a surface area with a relatively large section and then to define the outer shape of the blank with another type of strip having a surface area with a smaller section, and hence a reduced thickness, making it possible to give a more detailed shape to the outer face of the blank.

Each strip is manufactured by extrusion and then immediately wound so as to form the blank. Changing the type of strip therefore requires an intervention that interrupts the manufacture, for example a new adjustment of the extruder. Similarly, when it is desired to manufacture a blank for a tire of a different type requiring a strip of which the section has different characteristics, it is necessary to modify the adjustment of the extruder. These interventions slow down the manufacture of one and the same blank or of a series of blanks corresponding to different models.

SUMMARY OF THE INVENTION

One object of the invention is to accelerate the manufacture of the blanks by this technique.

Accordingly, according to one aspect of the invention, a method is provided for manufacturing an uncured blank of a vehicle tire, in which a strip of rubber is extruded and is made to pass between two members, one of which forms a roller for extruding the strip, such that faces of the strip, forming one and the same section of the strip in a plane perpendicular to a direction of travel of the strip and pressing simultaneously against the respective members, are driven at linear speeds that differ from one another, and that the members stretch the strip between them.

Thus, stretching is carried out within one and the same cross section of the strip. This stretching causes a change in its cross-sectional surface area, and in particular its thickness. It is therefore easy to choose the surface area of the section of the strip by modulating the stretching. This choice can be made without intervening in the feeding of the strip upstream, for example by extrusion. It is therefore possible at any time to modify the characteristics of the strip that is used to form the blank.

This modification can occur during winding in order to vary the thickness of the strip that is used to form the blank. It is therefore possible to manufacture a portion of the blank with turns of strip having a first cross-sectional surface area, and then another portion of the blank with turns of strip having another cross-sectional surface area.

When it is a matter of successively manufacturing blanks of different types, it is possible, by modifying the stretching applied to the strip, to very rapidly change the dimensional characteristics of the latter.

In all cases, the manufacture of the blanks is accelerated thereby, without however compromising compliance with their dimensional characteristics.

Preferably, the faces are driven at different speeds in one and the same section of the strip in a plane perpendicular to the direction of travel.

This produces a shearing of the strip.

Preferably, as it passes between the members, the strip is wound to form the blank.

In general, provision is made that, throughout the winding of the strip, it has at the time of its winding onto the blank a section radial to the axis of the blank, the width of which parallel to this axis is less than a quarter of the width of the blank.

Also preferably, traverse winding is carried out.

Thus, this sliding of the winding support relative to the members in a direction parallel to the winding axis makes it possible to modify the position of the medium fibre of the strip on the blank during the production of the latter. It makes it possible to place the strip in different locations on the profile of the blank in the course of manufacture. It is therefore possible to ensure that the sections of the strip situated in the same radial plane usually partially overlap. In most cases, the section is not placed in a flat configuration and the sections are not stacked in the direction radial to the axis. Some are stacked laterally.

Advantageously, at least one of the members forms a winding support.

Thus, the dimensions of the installation implementing the method are reduced and the production of the blank is accelerated since the strip passes over a reduced number of members.

Advantageously, with the strip passing from one of the members to the other, a linear speed of the strip over the upstream member is lower than a linear speed of the strip over the downstream member.

Advantageously, the linear speeds have a constant difference for a non-zero period.

Preferably, a linear speed of the strip over one of the two members, for example the upstream member when the strip passes from one of the members to the other, is constant for a non-zero period, for example for a total period of supply of the strip for the manufacture of the blank.

It is therefore possible to carry out for example the feeding of the strip, notably its extrusion, at constant speed.

Advantageously, a rotation speed of one of the two members, for example the downstream member when the strip passes from one of the members to the other, is varied for a non-zero period.

The strip forms for example a tread of the blank.

Also provided according to an aspect of the invention is a method for manufacturing a vehicle tire that uses a method according to the invention.

Also provided according to an aspect of the invention is an installation for manufacturing an uncured blank of a vehicle tire, which comprises:

two movable members, between which the installation is capable of causing a strip of rubber to pass, one of the members forming a roller for extruding the strip, and automated means capable of controlling the two members such that, during the passage, faces of the strip, forming one and the same section of the strip in a plane perpendicular to a direction of travel of the strip and pressing simultaneously against the respective members, are driven at linear speeds that differ from one another, and that the members stretch the strip between them.

Provision can be made for the members to have no heating means.

Specifically, an embodiment of the invention can be implemented without the members heating the strip.

Provision can be made for the installation to comprise a winding support for the blank, which support is mounted so as to slide, in a direction parallel to the winding axis, on a frame of the installation, relative to which the feeding member is fixed in its entirety. It is possible by contrast to provide for the support to be mounted so as to be slidingly fixed on the frame, the feeding member being mounted so as to slide relative to the latter.

Finally, provision is made according to an embodiment of the invention of an uncured blank of a vehicle tire, which comprises an uninterrupted rubber strip, in a single strand, wound over several turns and having a section, in a radial plane with respect to a main axis of the blank, that has a non-constant surface area along the strip and such that, in at least two sections of the strip extending in one and the same radial plane of the blank and situated following one another along the strip, a medium fibre of the strip occupies different respective positions along the axis.

Since the strip in this instance has only one strand, it has no zone in which the strip is provided for winding in the form of two or more strands wound at the same time. It is therefore possible to dispense with providing means for longitudinally cutting the strip before it is wound onto the blank. Thus, it is the whole of the rubber supplied during the manufacture and the feeding of the strip that is wound onto the blank in a single strand.

The movement of the medium fibre of the strip results from the traverse winding carried out during the winding, namely the sliding of the members relative to the winding support, in a direction parallel to the winding axis, in order to modify the general position of the strip in the blank.

BRIEF DESCRIPTION OF THE DRAWINGS

Other features and advantages of the invention will also become apparent from the following description of an embodiment given as a non-limiting example with reference to the appended drawings, in which.

DETAILED DESCRIPTION OF THE DRAWINGS

Figure 1:
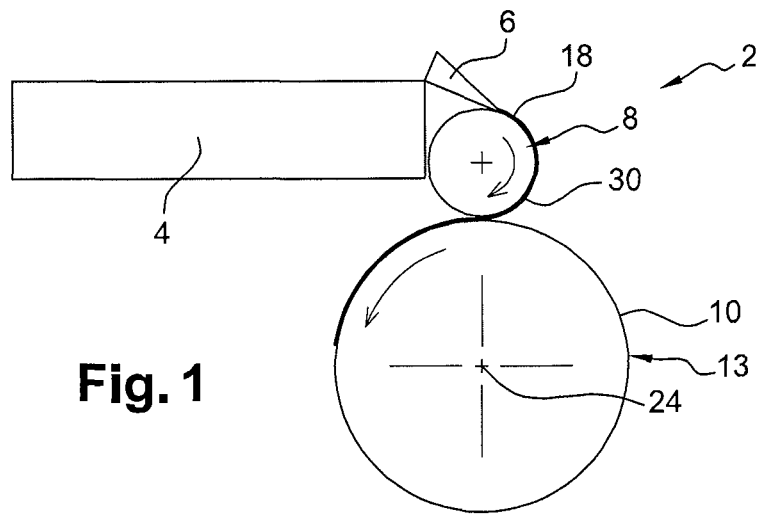
FIG. 1 is a schematic view of an installation for implementing the method according to an embodiment of the invention.
Figure 2:
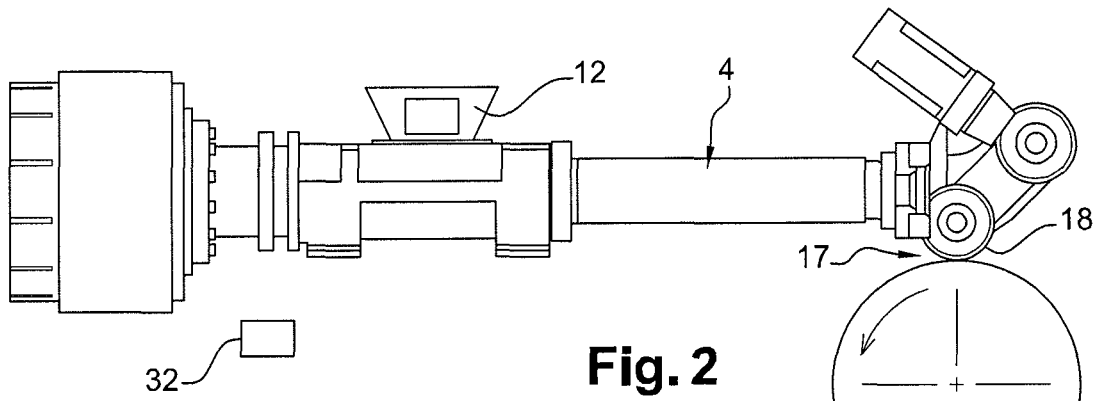
FIG. 2 is a more detailed view of the installation in FIG. 1.
Figure 3:
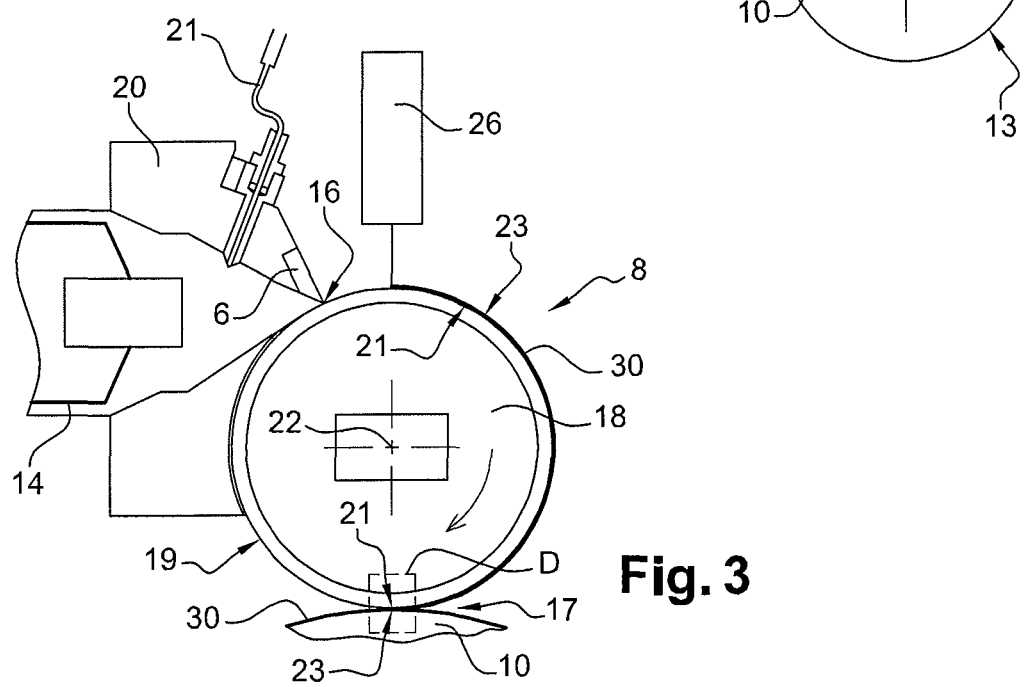
FIG. 3 is a view of the roller nose of the installation in FIG. 2.
Figure 4:
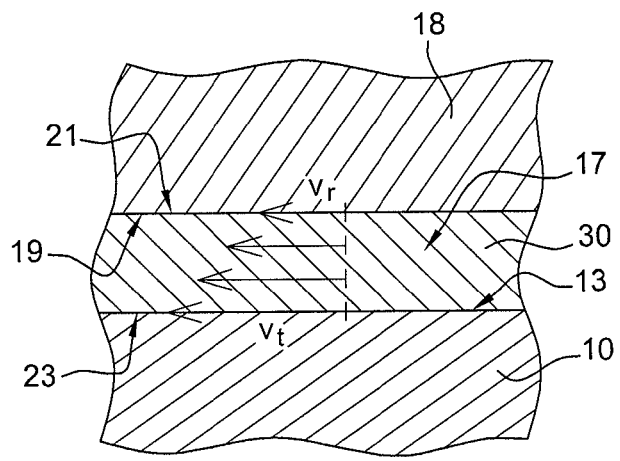
FIG. 4 is a view on a larger scale of the detail D from FIG. 3.

FIGS. 1 to 4 show an installation 2 according to the invention that is used for the manufacture of uncured tire blanks. These may be tires for wheels of passenger vehicles, of utility vehicles, of heavy goods vehicles or two-wheeled vehicles or else for construction machines.

Preferably, provision is made for the installation to generally conform, except for certain aspects described below, to the description given in application FR-2 914 581 in the name of the applicant and to which reference can be made for further details.

The method that will be described below is used for the manufacture of the tread of the blank but the invention is not restricted to the manufacture of this portion of the blank and may be used to produce one or two sidewalls of the blank.

The installation 2, comprises an extruder 4, an extrusion blade 6, a roller nose 8 and a form or drum 10 designed to support the blank 34 during its manufacture.

The extruder 4 comprises means 12 for receiving a mixture forming the rubber and comprising notably rubber and an elastomer. It comprises a stockscrew 14 that forces this mixture through an extrusion orifice 16 formed between the extrusion blade 6 and a roller 18 of the nose 8. The blade 6 is supported by a part 20 that forms an arch of the roller nose and guides the rubber to the orifice 16, from which there emerges a strip of rubber 30 forming a band. The roller 18 is mounted so as to rotate about a horizontal axis 22 parallel to a rotation axis 24 of the drum 10. The nose 8 comprises in this instance a member 26 for measuring the thickness of the band formed by the strip of rubber 30 extruded through the orifice 16. This member therefore makes it possible to control the conformity of this thickness measured in a direction radial to the axis 22. The part 20 supports a member 21 for measuring the temperature of the arch in order to control the extrusion process.

Figure 5:
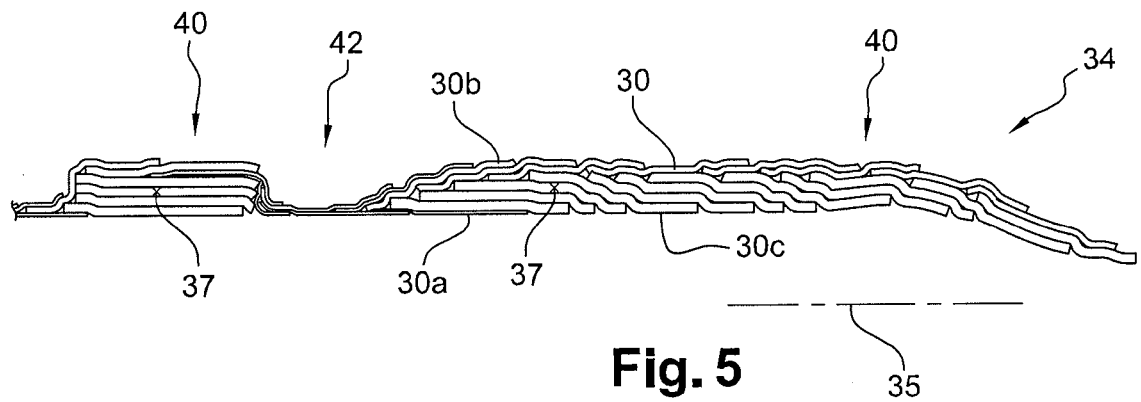
FIG. 5 is a partial view in section of a tire blank manufactured by means of the installation in the preceding figures.
Figure 6:
FIG. 6 is a view of a section of the strip used as a variant in the installation in FIG. 1.

The strip 30 has been illustrated notably in FIG. 5 on the completed blank 34, which also illustrates the main axis 35 of the blank. The blank has a generally toroidal shape with an axis 35. The strip 30 in this instance has a section, in a plane perpendicular to its direction of movement, having a rectangular shape. It would, however, be possible to choose to manufacture the strip 30 by giving it another shape of section, for example the lens shape illustrated in FIG. 6.

The drum 10 is associated with variable-speed driving means that are not illustrated and that are used to rotate it about its axis 24. The installation 2 comprises control means 32 capable of controlling the extruder 4, notably the rotation speed of the roller 18, and the drum 10. These means comprise computer elements such as a processor, a memory, and clock allowing them to control all or a portion of the steps of the method that will be explained below. This control is carried out by means of a program stored on a data storage medium comprising code instructions that are capable, when they are executed, of controlling the implementation of these steps.

The drum 10 is positioned in this instance so that its peripheral face 13 of cylindrical shape extends opposite the peripheral face 19 of the roller. At any time during the winding of the strip 30, the latter passes between the two members, forming a passageway 17 for itself and being pressured between the latter and pressing against the latter. In this instance provision is made for the extruder with the nose to be articulated about a horizontal axis, not illustrated, that is parallel to the axes 22 and 24 in order to preserve this passageway while the turns of the strip accumulate on the drum and increase the total diameter of the blank. Provision is also made for the extruder with the nose to be articulated about a horizontal axis, not illustrated, that is perpendicular to the axes 22 and 24 in order to make it easier to place the strip on the blank.

The implementation of the method of the invention by means of this installation will now be described.

In the present example, the strip 30 is extruded by means of the extruder 4 during the manufacture of the blank 34. The rubber pushed by the stockscrew 14 is therefore extruded through the orifice 16 to form a strip of rectangular cross section. The two large sides of the section forming its main faces are locally parallel.

The strip 30 first travels over a portion of the cylindrical outer face 19 of the roller 18, in its circumferential direction, in a manner rotated by the latter, in this instance in the clockwise direction in the figures.

It then enters the passageway 17. At this time, it is in contact with the nose 18 and pressing against the latter by way of its upper face 21 which is preparing to leave the roller, and pressing against the drum 10 by way of its lower face 23, the latter passing onto the outer face of the drum, which rotates the strip downstream, in this instance in the anticlockwise direction. The strip 30 is wound in several turns onto the drum 10 in the circumferential direction of the latter about the axis 24 which corresponds to the axis 35 of the blank. At the beginning of winding, the lower face 23 of the incident portion of the strip comes into contact with the drum. Then, it comes into contact with the outer face of the strip turns that have already been wound.

The control means 32 control the rotation of the roller 18 and of the drum 10 with respective angular speeds such that, at least at certain times during manufacture, in the passageway 17, the linear speed $V_t$ of the lower face 23 of the strip 30 (passing onto the drum 10) is greater than the linear speed $V_r$ of its upper face 21 (leaving the roller 18). This inequality relates to the faces 21 and 23 in one and the same section of the strip taken in a plane perpendicular to its local direction of travel. The corresponding two speed vectors have been illustrated in FIG. 4. They are collinear. Between the two faces, the various levels of the section have speeds that form a spatial gradient between the speeds of the two faces.

In the present example, this can occur at any time in the manufacture of the blank by means of the strip. It follows that the strip 30 is permanently stretched over its section between the roller 18 and the drum 10.

In this instance, the stretching is carried out on the lower face 23 without the upper face 21 being stretched, thereby causing the shearing of the strip in a direction parallel to its local plane. The result of this is a modification of the shape and of the dimensions of this section of the strip. In particular, the surface area of this section, and notably its thickness, is reduced. It is in this stretched configuration that the strip is wound onto the drum 10 to form the blank 34. The stretching of the strip and its winding onto the drum are carried out when it is still hot. At this stage, the rubber still has a very high plasticity, which allows it to withstand this considerable shearing without tearing.

The linear speeds $V_r$ and $V_t$ have a constant difference for several non-zero periods. Provision is also made for the linear speed $V_r$ to be constant throughout the supply of the strip for the manufacture of the blank. A rotation speed of the drum 10 is therefore varied for several non-zero periods.

The section of the strip therefore varies while it is wound to form the blank.

The control means 32 also control the traverse winding, namely, during winding, the sliding of the drum and of the blank along the axis 35 relative to the nose 8, sometimes at the same time as they control the variation of rotation speed.

It should be observed here that the strip is in a single strand, no cutting device being provided in this instance in the installation. Similarly, no member other than the nose and the drum extends in the path of the strip.

In the present example, there are therefore, on the section of the blank 34 that is illustrated, several types of section of strip 30 while the portion of the blank shown in FIG. 5 has been manufactured by uninterrupted winding of a single strip 30. Illustrated in the figure are three types of sections, respectively with a thin thickness 30a, a medium thickness 30b, and a large thickness 30c, these notions being in relation to one another. Manufacturing is carried out by beginning with a section of thin strip 30a to form an inner portion of the blank. It continues by slowing down the drum 10 in order to increase the thickness of the strip in order to put in place the strip with the section 30c of large thickness. Then, the speed of the drum is again increased to reduce the thickness of the strip and put in place on the blank the section 30b of medium thickness. Then, manufacturing is completed by again increasing the speed of the drum 10 in order to put in place the strip with a thin thickness 30a on the outer portion of the blank.

FIG. 5 shows that the strip is arranged in several tens of turns about the axis 35 of the blank. In most cases, the current section of the strip partially overlaps at least one section of a previous turn of the strip and is itself overlapped by one or more sections of subsequent turns of the strip.

In the present example, the strip 30 has at the outlet of the orifice 16 a section of 33.3 millimeters squared and a speed of 3.33 meters per second. The thickness 30a corresponds to a section of strip of 21.2 millimeters squared for a linear speed of the strip at the surface of the drum 10 of 5.22 meters per second. For the medium thickness 30b, these values are respectively 25 millimeters squared and 4.43 meters per second. For the large thickness 30c, these values switch to 28.7 millimeters squared and 3.87 meters per second. Naturally, the higher the speed of the drum 10, the smaller are the surface area of the section of the strip and its thickness in the direction radial to the axis 24.

The method of the invention makes it possible to comply with the various dimensional constraints of the architecture of the general profile of the blank as illustrated in FIG. 5. Therefore, along the axis 35, the blank may have solid zones or filling zones 40 separated by hollow zones 42.

In the solid zones 40, also called slabs, at least certain sections of the strip are given a large surface area. On the other hand, in the hollow zones 42, there are only a few thicknesses of strip with a surface area of reduced section. This thickness is also used for coating the outside of the whole blank, notably of the slab zones 40.

The possibility provided by the method of the invention of varying, during winding, the surface area of the section of the strip and the winding zone by virtue of the sliding makes it possible to form the hollow zone 42 with only a few layers of strip and great dimensional precision, while it makes it possible to produce the slabs 40 rapidly by virtue of the putting in place of several turns of strip with a large sectional surface area.

The method makes it possible to comply precisely with the dimensions of these two types of zones. Thus, the dimension of sub-hollow 42, measured in the direction radial to the axis 35, is of great importance for the manufacture of the tread because it directly influences the subsequent position of the threads of the crown ply of the tire after curing. If this dimension is not complied with, an indenting of the crown plies is observed which is harmful to the service life of the tire. Similarly, the height of the slabs formed by the solid zones 40 directly influences the quality of the finished product after vulcanization.

It is possible for example to choose the rotation speed of the roller 18 so that the speed of the strip at its surface is approximately 20% less than the speed of the strip at its exit from the extrusion orifice.

The members 18 and 10 in this instance have no heating means because it is not necessary to provide heat to the strip during the implementation of the method.

The invention applies to a strip of which the surface area is situated for example between 15 and 50 millimeters squared with a maximum travel speed of 5 meters per second for a strip feed rate that may go up to 10 kilograms per minute. The extruder 4 and the roller nose 8 may be installed on a three-axis robot synchronized with the blank rolling drum 10.

During the method, the shape and the dimensions of the orifice 16 of the extruder remain constant. This is an advantage because, conversely, if it were to be envisaged to reduce the section of the strip at the extrusion orifice by modifying the dimensions of the latter to an equal feed rate, this would generate an increase in the shearing speed gradient on the strip and hence an increase in the temperature of the extruded material, and also a reduction in the feed rate of the extruder. With the invention, a strip with a constant section of relatively large size is extruded and then it is stretched more or less during the operation of placement on the crown of the blank in order to adjust this section during the manufacture of the blank. Modifying the rotation speed of the drum 10 makes it possible to vary the section of the strip during winding without interrupting manufacture.

The blank therefore comprises an uninterrupted strip 30 of rubber, with a single strand, wound over several turns and having a section, in a plane radial to the axis 35, that has a non-constant surface area along the strip. In at least two sections of the strip extending in one and the same radial plane of the blank and situated after one another along the strip, a medium fibre 37 of the strip occupies different respective positions along the axis 35.

A few items of quantitative information are given below, matching the section of the strip extruded at the orifice 16 in millimeters squared, the feed rate of the strip in grams per second, the weight of the tread to be manufactured, the time for placement of the strip on the blank in seconds, the surface area of the section placed on the drum in millimeters squared and finally the placement speed in meters per second. Only the last line is associated with stretching of the strip.

| Extruded section in mm$^2$ | Feed rate in g/sec | Weight of tread to be manufactured in kg | Placement time in seconds | Section placed on drum in mm$^2$ | Placement speed in m/s |
|---|---|---|---|---|---|
| 20 | 100 | 3 | 30 | 20 | 5 |
| 40 | 150 | 3 | 20 | 40 | 3.75 |
| 40 | 150 | 3 | 20 | 20 | 7.5 |

After the manufacture of the blank, the latter is the subject of the usual steps of tire manufacture, notably vulcanization for curing the blank.

In another embodiment, it is possible, throughout the manufacture of the blank, to provide for the rotation speeds of the nose 18 and of the drum 10 to be constant. The linear speeds $V_r$ and $V_t$ remain different from one another in order to stretch the strip. The blank is therefore formed with a strip having a single type of section. After manufacture, in order to produce another type of blank, it is sufficient to modify the difference between the rotation speeds. In this way, it is possible to adapt the section of the band to the type of blank to be manufactured and not to penalize the productivity of the machine that manufactures these various models in succession. It is possible for example to extrude the band with a section of 33.3 mm$^2$ and produce successive blanks with a band section of between 20 and 30 mm$^2$ at 3.67 m/s.

Although it is advantageous to produce the tread of the blank by means of a single stretched strip, it is possible to implement the invention by successively or simultaneously using several stretched strips for one and the same blank.

It is also possible to provide that the strip is stretched only for a portion of the winding. The blank will then comprise one or more turns of strip of which the section is substantially identical to the extruded section and one or more turns of strip of which the section is modified following the stretching.

In another embodiment, it is possible to provide for the drum 18 to be moved away from the roller 10 so that the strip is not in simultaneous contact with these two members when it passes from one to the other. There is therefore a sectional length of strip that is stretched between the nose that it has left and the drum onto which it has not yet passed. The control means 32 control the rotation of the roller 18 and of the drum 10 with respective angular speeds such that, at least at certain times during manufacture, the linear speed $V_t$ of the strip 30, as it passes onto the drum 10, is greater than the linear speed $V_r$ of the strip as it exits the roller 18. The result is that the strip 30 is permanently stretched along the whole length of its sectional length situated between the exit from the roller 18 and the entrance to the drum 10. This stretching causes a change in the shape and in the dimensions of the section of the strip taken in a plane perpendicular to its direction of travel. In particular, the surface area of this section, and notably its thickness, is reduced. It is in this stretched configuration that the strip is wound onto the drum 10 to form the blank 34. This time, there is no shearing in the cross section.

This embodiment is, however, less advantageous to the extent that the tension might be transmitted to the extrusion orifice, thereby making it difficult to comply with the dimensional characteristics of the extruded strip.

The invention claimed is:

1. A method for manufacturing an uncured blank of a vehicle tire, wherein a strip of rubber is extruded and is made to pass between two members, one of which forms a roller for extruding the strip, such that faces of the strip, forming one and the same section of the strip in a plane perpendicular to a direction of travel of the strip and pressing simultaneously against the respective members, are driven at linear speeds that differ from one another, and that the members stretch the strip between them, wherein the difference between the linear speeds of the faces, in said section of the strip pressed simultaneously against the two members, increases and decreases during the manufacturing so as to modify the cross-sectional area of the strip, each linear speed difference corresponding to a respective cross-sectional area.

2. The method according to claim 1, wherein the faces are driven at different speeds in one and the same section of the strip in a plane perpendicular to the direction of travel.

3. The method according to claim 1, wherein, as it passes between the members, the strip is wound to form the blank.

4. The method according to claim 1, wherein traverse winding is carried out.

5. The method according to claim 1, wherein one of the members forms a winding support.

6. The method according to claim 1, wherein the two members comprise an upstream member and a downstream member, the upstream member being upstream of the downstream member, and wherein, with the strip passing from one of the members to the other, a linear speed of the strip over the upstream member is lower than a linear speed of the strip over the downstream member, the linear speeds having a constant difference for a non-zero period.

7. The method according to claim 1, wherein a linear speed of the strip over one of the two members is constant for a non-zero period.

8. The method according to claim 1, wherein a rotation speed of one of the two members is varied for a non-zero period.

9. The method according to claim 7, wherein the two members comprise an upstream member and a downstream member, the upstream member being upstream of the downstream member, wherein the linear speed of the strip over the upstream member when the strip passes from one of the members to the other is constant for a non-zero period.

10. The method according to claim 9, wherein the non-zero period is a total period of supply of the strip for the manufacture of the blank.

11. The method according to claim 8, wherein the two members comprise an upstream member and a downstream member, the upstream member being upstream of the downstream member, wherein the rotation speed of the downstream member when the strip passes from one of the members to the other, is varied for a non-zero period.

* * * * *